United States Patent

[11] 3,603,159

[72] Inventor Jack A. Morrow
 Bellevue, Wash.
[21] Appl. No. 855,839
[22] Filed Sept. 8, 1969
[45] Patented Sept. 7, 1971
[73] Assignee United Control Corporation

[54] PRELOAD ADJUSTMENT MEANS FOR A TRANSDUCER
 12 Claims, 4 Drawing Figs.
[52] U.S. Cl. .................................................. 73/517, 308/159
[51] Int. Cl. ..................................................... G01p 15/08
[50] Field of Search ........................................... 73/514, 515, 516, 517; 308/159

[56] References Cited
 UNITED STATES PATENTS
2,883,176 4/1959 Bernstein .................... 73/516
3,246,525 4/1966 Clark........................... 73/517

Primary Examiner—Richard C. Queisser
Assistant Examiner—Herbert Goldstein
Attorney—Hofgren, Wegner, Allen, Stellman & McCord ABSTRACT: A preload adjustment means for the seismic element of a pendulous accelerometer in which the seismic element is rotatably mounted on the free end of a cantilevered leaf spring. An adjustment screw is mounted through a bore in the support structure for movement in a direction parallel to the leaf spring. An L-shaped spring link between the screw and the leaf spring transmits movement of the screw to the spring link and the leaf spring to adjust the pressure exerted on the seismic element. The coefficients of expansion of the springs and the screw are matched to temperature compensate the preload adjustment means.

PATENTED SEP 7 1971 3,603,159
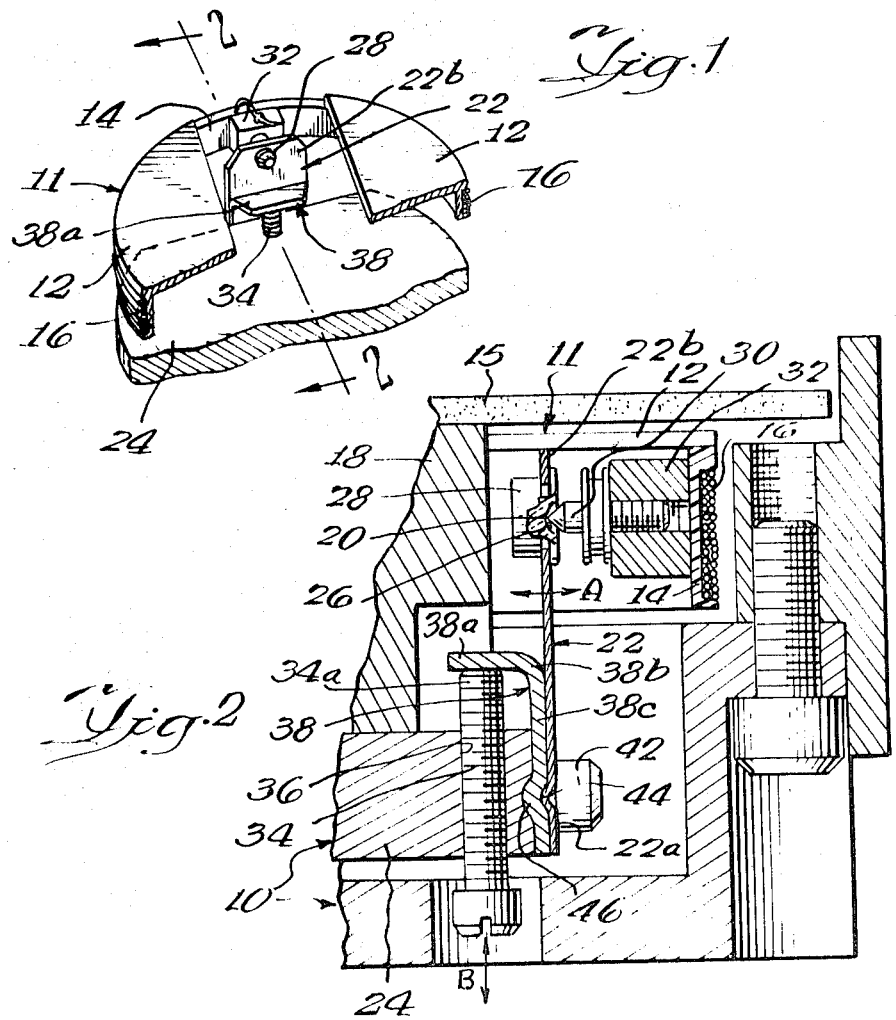
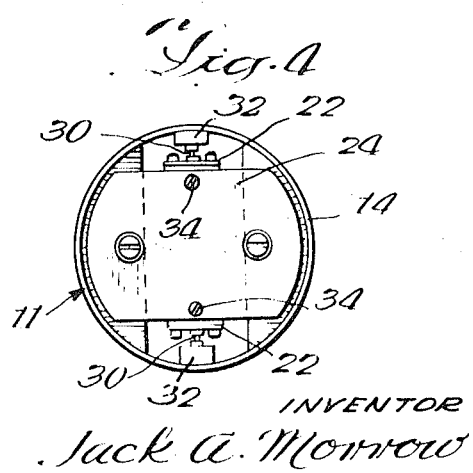
INVENTOR
Jack A. Morrow
BY Hofgren, Wegner, Allen, Stellman & McCord
ATTORNEYS

PRELOAD ADJUSTMENT MEANS FOR A TRANSDUCER

BACKGROUND OF THE INVENTION

This invention relates to transducers such as accelerometers and the like, and more particularly to a preload adjustment means for a rotatably or pivotally mounted element of a transducer.

Preload adjustment means are commonly provided for pendulous accelerometers and other transducers in which a seismic or sensitive element is rotatably or pivotally mounted on an axis fixed relative to a support structure, for rotation or pivoting of the seismic element in response to acceleration of the support structure in a given direction. Prior preload adjustment means have consisted of a leaf spring having a cantilevered free end mounting a bearing for pivotally supporting the seismic element. A screw has been mounted through a bore in a support structure and into abutment against a portion of the cantilevered leaf spring. As the screw is rotated in the bore, the end of the screw acts directly on the cantilevered leaf spring and thereby adjusts the pressure of the bearing against the pivoted seismic element. Such a construction has a number of disadvantages which the present invention overcomes.

Prior preload adjustment means of the above nature do not allow gradual loading of the bearing against the pivoted seismic element. This result is in part due to the limitation on the number of threads and pitch of the screw, especially critical because accelerometers are typically of miniature or almost microminiature size. Furthermore, such structures have not been stable in their environment. That is, accelerometers are subjected to sudden accelerations, and further are subjected to vibrations which may cause the screw to rotate in its bore, thereby changing the preselected loading of the bearing against the pivoted seismic element. In addition, such prior structures have not been temperature compensated, in that changes in temperature cause changes in the length of the screw and hence change the preload pressure on the bearing.

SUMMARY OF THE INVENTION

In accordance with the present invention, an improved preload adjustment means is disclosed which overcomes all of the above noted disadvantages of prior structures. A link spring is provided between the adjustment screw and the cantilevered leaf spring for the seismic element, which link spring flexes in response to movement of the screw and produces a corresponding but scaled down movement of the cantilevered leaf spring. This structure makes the preload adjustment stable with its environment, in that it takes a considerable movement of the screw to significantly change the preload pressure. The link spring is in the form of an L-shaped lever member which includes a first leg portion which extends generally perpendicular to and engages the link spring and a second leg portion positioned generally flush with the leaf spring and fixed to the support structure adjacent the fixed end of the cantilevered leaf spring. The elbow of the L-shaped lever at the junction between the first and second portions is disposed intermediate the ends of and adjacent the leaf spring. The screw adjustment is threaded into a bore in the support structure on an axis which extends generally parallel to a line which passes through the fixed end of a leaf spring and the point of pivotal connection between the seismic element and the free end of the leaf spring. The first leg portion of the lever member overlies the end of the adjusting screw whereby axial movement of the screw toward the first leg portion of the lever member causes the end of the screw member to abut against the first leg portion and pivot the lever member into engagement with the leaf spring.

The coefficient of expansion of the L-shaped lever member and the screw are matched in order to temperature compensate the preload adjustment means. As the screw increases in length with an increase in temperature, the L-shaped lever increases along the same axis by the same length, thereby maintaining constant the effect of the screw against the overlying first leg portion. As a result, the flexure of the lever remains fixed.

The L-shaped lever is of a width sufficient to cover the width of the leaf spring, and is of a greater thickness in order to stabilize the cantilevered leaf spring and prevent flexure or twisting therein in any direction other than generally perpendicular to the plane of the leaf spring.

One feature of this invention is the provision of an improved preload adjustment means which permits gradual loading of a bearing against a pivoted element.

Another feature of this invention is the provision of a preload adjustment means which is stable within a changing environment, and which maintains a preselected loading even when the adjustment member itself is inadvertently rotated.

Yet another feature of this invention is the provision of a preload adjustment means which is temperature compensated in order to maintain constant the loading of a bearing against a pivoted element.

Other features, objects and advantages of the invention will become apparent from the following detailed description taken in connection with the accompanying drawings.

FIG. 1 is a perspective view, partially cut away, of an accelerometer embodying the preload adjustment means of the present invention, with certain components of the accelerometer not shown to better facilitate the illustration of the preload adjustment means;

FIG. 2 is a sectional view, on an enlarged scale, taken generally along the line 2—2 of FIG. 1;

FIG. 3 is a full top plan view, on a reduced scale, of the structure shown in FIG. 1; and FIG. 4 is a full bottom plan view, on a reduced scale, of the structure shown in FIG. 1.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

DETAILED DESCRIPTION OF THE INVENTION

The preload adjustment means of the present invention is shown in the drawings as incorporated in an accelerometer or the like which includes a seismic or sensitive element rotatably mounted relative to a support structure, generally designated 10, for rotation or pivoting of the seismic element in response to acceleration of the support structure in a given direction, normally generally transverse to the axis of rotation of the seismic element. Before proceeding to a detailed description of the preload adjustment means of this invention, a general description of the accelerometer is deemed appropriate.

The accelerometer shown in the drawings is of the servoed type using servomechanical capture of a seismic mass. By action of the servo, the seismic mass 11 is returned to a level position, balancing an input force which is proportional to acceleration with an automatically generated feedback force which is proportional to servo current through a capturing coil 16 carried by the seismic mass.

Seismic mass 11 includes a pair of spaced generally planar capacitor plates 12. The capacitor plates 12 are part of a unit which includes an integral bobbin 14 with the capture coil 16 wound thereabout. As will be described in greater detail hereinafter, the seismic mass 11 is rotatably or pivotally mounted at spaced points relative to the support structure 10 to define an axis of rotation for the seismic mass relative to the support structure.

To detect the rotation of the seismic mass 11 relative to support structure 10, a second pair of capacitor plates are spaced from and disposed normally parallel to the capacitor plates 12 in a position above the plates 12 shown in the drawings. Typically, such second capacitor plates may be formed of metal deposited on the bottom of a plate 15 fabricated of ceramic material. Each plate 12 has a corresponding metal plate on plate 15, which together form one capacitor. Plate 15 is mounted against a permanent magnet 18, FIG. 2, which is disposed within a central aperture between capacitor plates 12 and spaced therefrom. Permanent magnet 18 is in turn affixed to support means 10, thus causing the second pair of capacitor plates on the bottom side of ceramic plate 15 to be fixed with respect to the support means.

In operation, seismic mass 11 and hence capacitor plates 12 rotate relative to the fixed capacitor plates on ceramic plate 15 in response to acceleration of the support structure 10 in a direction transverse to the axis of pivoting of seismic mass 11. This decreases the gap between the capacitor plates on one side of the axis of rotation, while increasing the gap between the capacitor plates on the other side of the axis of rotation. As is well known, capacitive reactance increases as the gap lessens between one pair of capacitor plates, and decreases as the gap widens between the other pair of capacitor plates. The capacitor plates are connected in a differential circuit which responds to the reactive imbalance to generate a proportional voltage. This voltage or error signal is amplified and coupled to capturing coil 16 to create a force which in conjunction with the other magnetic fields causes the seismic mass 11 to rotate in a direction opposite to that caused by acceleration, returning seismic mass 11 to the same level position as when no acceleration occurs. The amount of current through capturing coil 16 is thus a measure of the acceleration.

The preload adjustment means of this invention maintains a desired amount of preload on the bearings which form the pivot points 20 for the seismic mass 11. Such preload adjustment means includes a generally planar leaf spring, generally designated 22, having one end 22a fixed to a support block portion 24 of the support structure 10. The opposite end 22b of the leaf spring is a free end whereby the leaf spring is cantilevered for flexure in a direction generally transverse to the plane of the spring and hence in the direction of arrow A (FIG. 2).

Means are provided for mounting the seismic mass 11 on the free end 22b of the leaf spring 22 for rotation or pivoting of the pendulous mass relative to the support structure 10. The mounting means includes a generally rounded, concave socket 26 formed in a pivot block 28 secured to the free end 22b of the leaf spring 22. An end of a pointed projecting means 30 is threaded into a second mounting block 32 secured to the inside of the bobbin 14 whereby the pointed end of projecting means 30 extends into the socket 26 to provide a free pivot mounting between the seismic mass 11 and the leaf spring 22.

Referring to FIGS. 3 and 4, it is seen that a spaced pair of such leaf springs 22 and mounting means 26, 28, 30, 32 are provided between the seismic mass 11 and the support structure 10 to provide a pair of spaced pivot points which define the axis of rotation for the seismic mass. By providing such leaf springs bearing against the seismic mass 11 in opposite directions, a balanced preload pressure is provided.

The amount of preload pressure is made adjustable by use of an adjustment member in the form of a threaded screw member 34 which is threaded into a bore 36, see FIG. 2, in the support block portion 24 of the support structure 10. Screw 34 has an axis which extends generally parallel to a line which passes through the fixed end 22a of the leaf spring 22 and the point 20 of rotatable connection between the seismic mass 11 and the free end 22b of the leaf spring.

To permit gradual loading of the pivots and bearings, and many other advantages of the invention, a spring link 38 is provided between the adjusting screw members 34 and the leaf spring 22. The spring link, in the form of a generally L-shaped lever member, flexes in response to movement of the adjusting screw 34 in the direction of arrow B, in turn flexing the leaf spring 22 in the direction of arrow A, and thereby adjusts the pressure at point 20 between the leaf spring 22 and the seismic mass.

The lever or spring member 38 includes a first leg portion 38a which extends generally perpendicular to and engages the leaf spring 22 at an elbow or juncture 38b between the first leg portion 38a and a second leg portion 38c of the lever 38. The second leg portion 38c lies generally flush with the leaf spring 22 and is sandwiched between the leaf spring and the support block portion 24 of the support structure 10 at the fixed end 22a of the leaf spring. Second plate portion 38c and fixed end 22a are mounted to support block portion 24 by a screw 42 extending through apertures in those elements and into an internally threaded bore within the support block 24. Thus, the juncture or elbow 38b of the lever 38 is disposed generally intermediate the ends of the leaf spring 22.

Lever 38 allows flexure between the first and second portions, thereby scaling down the motion in screw member 34 into a lesser amount of motion applied transversely against the plane of leaf spring 22. Because this acts as series connected springs, a gradual loading of the pivot points 20 is accomplished. Furthermore, undesired movement of the screw member 34, such as caused by vibration, has little effect on changing the pressure at the pivot point 20, because a considerable amount of movement of the screw member 34 is necessary to significantly affect the pressure on the bearing point. As seen in FIG. 2, the first leg portion 38a of the lever 38 overlies the inner end 34a of the adjusting screw member 34 whereby axial movement of the screw member against the first leg portion 38a causes flexure of lever 38 and resulting movement along an axis transverse to the plane of second leg portion 38c of the lever 38. This in turn flexes the cantilevered leaf spring 22 and changes the pressure at the pivot point 20 between the free end 22b of the leaf spring and the seismic mass.

Preferably, the width of lever 38 is equal to and covers the width of leaf spring 22. In addition, the thickness of lever 38 is approximately twice the thickness of leaf spring 22. Such dimensions allow the lever 38 to stabilize leaf spring 22 and prevent twisting of the elongated cantilevered beam. This structure makes the preload adjustment means stable with its environment.

The preload adjustment means is temperature compensated so that changes in temperature do not change the pressure of the pivot against the bearing. This is accomplished by matching the coefficient of expansion of screw 34 with the coefficient of expansion of lever 38 and leaf spring 22. For example, both lever 38 and leaf spring 22 may be formed of beryllium copper, and screw 34 may be formed of stainless steel. The coefficient of expansion of both of the materials are approximately equal, producing canceling movement as will now be explained. As the temperature increases, for example, the length of screw member 34 axially increases. Without compensation, such increased length would flex lever 34 by a greater degree, thereby changing the pressure at the cantilevered free end 22b. However, the coefficient of expansion of lever 38 equals the coefficient of expansion of screw 34. The longitudinal increase in the length of the second leg portion 38c coincides with the longitudinal increase in length of screw 34, thereby raising the perpendicular end 38a upward from the screw by an amount equal to the increased axial expansion of the screw. As a result, the pressure exerted against lever 38 remains constant, maintaining the flexure constant, and in turn maintaining the same flexure of the cantilevered leaf spring 22. Hence, a change in temperature does not cause corresponding movement of the free cantilevered end 22b of the leaf spring 22.

To prevent slip between lever 38 and leaf spring 22, the end 22a includes a dimple 44, the convex surface of which nests within a concave surface of a dimple 46 in leg portion 38c. The convex surface of dimple 46 is in turn press-fit into a countersunk guide in support block portion 24. The nested dimple and countersunk guide prevent relative slip between leaf spring 22 and lever 38 as screw 34 is rotated.

While the preload adjustment means has been illustrated for a pendulous accelerometer, it will be apparent that the principle is equally applicable to any transducer in which an element is rotatably or pivotally mounted relative to other parts of the transducer. The foregoing detailed description has been given for clearness of understanding only, and no unnecessary limitation should be understood therefrom.

I claim:

1. In a transducer having a leaf spring with an end fixed to a support structure and a cantilevered free end, bearing means mounting an element to said free end for rotatable motion relative to said leaf spring, and an adjustment member movable along an axis to ultimately adjust the pressure exerted on said element by said leaf spring, the improvement comprising:

link spring means having a first portion and a second portion spaced therefrom, said link spring flexing when pressure is applied to said second portion to exert pressure which produces movement of said first portion;

means mounting said first portion of said link spring to said leaf spring at a point between said fixed end and said free end for flexing said leaf spring in response to movement of said first portion caused by pressure applied to said second portion of said link spring; and means mounting said adjustment member for movement along an axis bearing against said second portion of said link spring to apply pressure which flexes said link spring and produce movement of said first portion of said link spring, thereby flexing said leaf spring to adjust the pressure exerted on said element.

2. The transducer of claim 1 wherein said adjustment member comprises a screw member threaded into a bore in said support structure along an axis which extends at an angle to an axis perpendicular to the plane of the leaf spring and coinciding with the axis of rotation of said element, the first and second portions of said link spring being at an angle with respect to each other to form a lever member which transfers axial forces from said screw member to said leaf spring to cause flexure of the leaf spring along said axis perpendicular to the plane thereof.

3. The transducer of claim 2 wherein said link spring has a width covering a substantial portion of the width of said leaf spring to prevent twisting of said leaf spring along its cantilevered extent.

4. The transducer of claim 3 wherein said link spring has a thickness greater than the thickness of said leaf spring to further prevent twisting of said leaf spring along its cantilevered extent.

5. The transducer of claim 2 wherein the axis of said bore extends generally parallel to a line which passes through said fixed end of the leaf spring and a point of rotatable connection between said element and the free end of said leaf spring, said link spring comprises a generally L-shaped lever with said second portion extending generally perpendicular to and overlying an end of said screw member and said first portion being generally flush with said leaf spring, whereby axial movement of the screw member towards said second portion of the L-shaped lever flexes the lever and moves said leaf spring along said perpendicular axis.

6. The transducer of claim 5 wherein said L-shaped lever includes a juncture between said first and second portions, a part of said first portion spaced from said juncture being fixed to said support structure adjacent said fixed end of said leaf spring.

7. The transducer of claim 1 wherein at least a part of said first portion extends parallel to the axis of movement of said adjustment member, said adjustment member and at least said parallel extending part of said link spring being formed of materials with similar coefficients of expansion, thereby temperature compensating said transducer.

8. The transducer of claim 7 wherein the material of said parallel extending part of said link spring is the same material forming said leaf spring.

9. The transducer of claim 7 wherein said link spring is generally L-shaped and said second portion extends generally perpendicular to said extending part and overlies an end of said adjustment member, said adjustment member comprises a screw member threaded into a bore in said support structure on an axis which extends generally parallel to the axis of said parallel extending part, an end of said screw member abutting said second portion of said link spring, said extending part being generally flush with said leaf spring.

10. The transducer of claim 1 wherein said bearing means includes means defining a socket on the free end of said leaf spring and projection means on said element and extending into said socket providing a free pivot mounting between the element and the leaf spring.

11. The transducer of claim 10 wherein said socket is generally rounded and concave, and said projection means is pointed.

12. The transducer of claim 1 including a spaced pair of said leaf springs and adjustment members, the bearing means for the pair of leaf springs defining therebetween an axis of rotation for said element, said pair of leaf springs bearing against said element in opposite directions to provide a balanced preload pressure on said element.